United States Patent
Kim

(10) Patent No.: US 7,779,723 B2
(45) Date of Patent: Aug. 24, 2010

(54) ANTI-LOOSENING DEVICE FOR PARKING BRAKE

(75) Inventor: Yeon-Soo Kim, Ansan-Si (KR)

(73) Assignee: Dongwoun Industrial Co., Ltd., Wonsi-Dong, Ansan-Si, Gyeonggi-Do (KR)

( * ) Notice: Subject to any disclaimer, the term of this patent is extended or adjusted under 35 U.S.C. 154(b) by 966 days.

(21) Appl. No.: 11/347,420

(22) Filed: Feb. 2, 2006

(65) Prior Publication Data

US 2007/0175291 A1 Aug. 2, 2007

(51) Int. Cl.
*G05G 5/06* (2006.01)

(52) U.S. Cl. .......................................... 74/535; 74/537

(58) Field of Classification Search ................... 74/528, 74/537, 533, 575, 577 R, 577 S, 577 SF, 74/577 M, 535, 536
See application file for complete search history.

(56) References Cited

U.S. PATENT DOCUMENTS 5,272,935 A * 12/1993 Heinemann et al. ........... 74/523
5,816,111 A * 10/1998 Borchers ...................... 74/535
5,819,595 A * 10/1998 Cebollero .................... 74/535
2002/0174737 A1* 11/2002 Revelis et al. .............. 74/501.6
2004/0074331 A1* 4/2004 Sykes et al. .................. 74/523

* cited by examiner

*Primary Examiner*—Richard W Ridley
*Assistant Examiner*—Daniel Yabut
(74) *Attorney, Agent, or Firm*—GWiPS

(57) ABSTRACT

An anti-loosening device for a parking brake is provided to securely park a vehicle comprising: a ratchet wheel (20) having multiple teeth (21) formed on an arc-shaped edge, a pivot hole (22) located at a center of the arc, an operating lever (40) having an upper portion forming a tube-shaped handle, a lower portion forming a flat and narrow cavity, a latching mechanism (60) consisting of a pawl (61), a slot (62), a rotating shaft (31), and an elastic spring (80), a lever operating mechanism consisting of an operating rod (70), a coil spring (71), and a push button (72), wherein the operating lever (40) is mounted on the ratchet wheel (20) for rotation with respect to the pivot shaft (30), one end of the operating rod (70) is mounted on the push button (72) with the coil spring (71) and the other end of the operating rod (70) is connected to the slot (62) of the latching mechanism (60).

1 Claim, 5 Drawing Sheets

ANTI-LOOSENING DEVICE FOR PARKING BRAKE

BACKGROUND OF THE INVENTION

1. Field of the Invention

The present invention relates to an anti-loosening device for an automotive parking brake. More particularly, the invention provides a device for securing a parking brake and preventing accidental disengagement of the parking-brake while a vehicle is parked, so as to prevent accidents due to the loosening of the parking brake. The parking brake also has a simple configuration to reduce the production cost.

2. Description of the Prior Art

A parking brake is generally used when a car is parked at a parking lot or waiting for a traffic signal at an intersection to avoid unintentional movement. Especially, if a car is parked on a hill (on a sloped road or parking place), it is essential to make sure the parking brake is engaged to prevent an accident due to the loosening of the braking system.

A Korean Patent Application No. 2002-0055945 discloses a conventional parking brake device comprising a ratchet wheel with teeth, the brackets for mounting on an auto-body, a shaft hole, a lever consisting of an upper portion and a lower portion, a brake cable connected to the lever and braking system, a latching mechanism and a lever mechanism.

This conventional parking brake device is configured such that the operating rod of the lever mechanism is indirectly connected to the ratchet mechanism for limiting the rotation, thus it has the disadvantage of transmitting the pressing force of the pushed button and the resilient forces of the coil spring to the latching mechanism.

However, the conventional parking brake device has the disadvantage that it does not provide a failsafe system to prevent the unwanted disengagement of the parking-brake while the car is parked. Thus, it won't prevent an accident due to the loosening of the parking brake. The conventional parking brake has a complicated configuration. Therefore, it is not easy to assemble on a production line and has the disadvantage of a high production cost.

SUMMARY OF THE INVENTION

Accordingly, the purpose of the present invention is to provide a parking brake having a simple mechanism for secure operation and reducing the production cost.

In order to fulfill the above purpose, an anti-loosening device for a parking brake of the present invention is developed comprising: a ratchet wheel base (20) having multiple teeth (21) formed on an arc-shaped edge, a set of brackets for mounting on an auto-body, a pivot pin (30) and a pivot hole (22) located at a center of the arc, an operating lever (40) having an upper portion forming a tube-shaped handle, and a lower portion forming a flat and narrow cavity for installing operating mechanisms, a brake cable linkage (50) connected to a bottom portion of the operating lever (40) and a braking mechanism, a latching mechanism (60) consisting of a pawl (61), a slot (62), a rotating shaft (31), and an elastic spring (80), the latching mechanism (60) disposed adjacent to the arc-shaped teeth (21), and a lever operating mechanism consisting of an operating rod (70), a coil spring (71), and a push button (72).

An objective of the present invention is to provide the operating lever (40) mounted on the ratchet wheel base (20) for rotation with respect to the pivot shaft (30).

Another objective of the present invention is to provide the lever operating mechanism configured such that one end of the operating rod (70) is mounted on the push button (72) with the coil spring (71), and the other end of the operating rod (70) is connected to the slot (62) of the latching mechanism (60).

DETAILED DESCRIPTION OF THE PREFERRED EMBODIMENT

Figure 1:
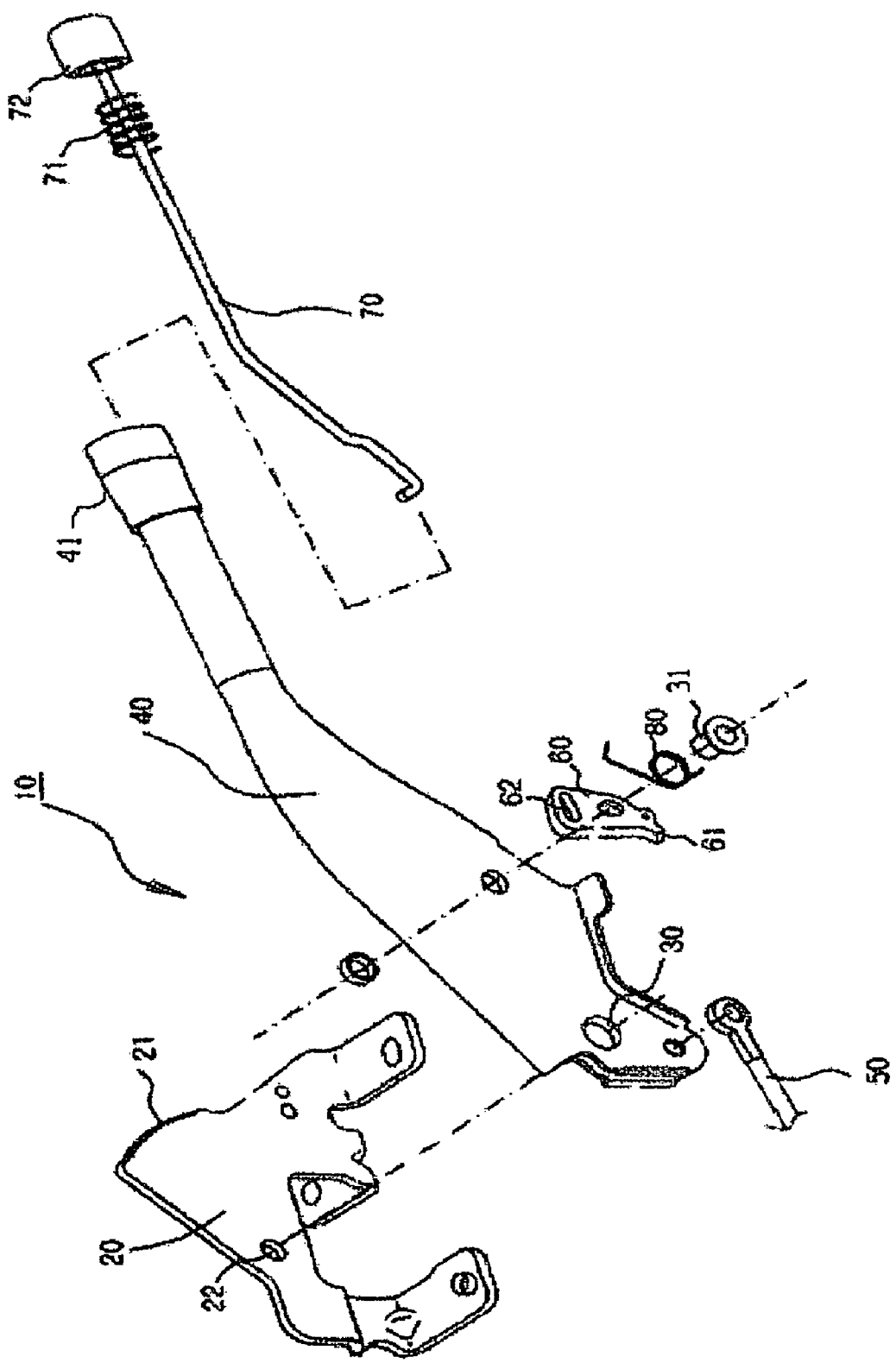
FIG. 1 is a perspective view of the parking brake of the present invention for illustrating the exploded components.
Figure 2:
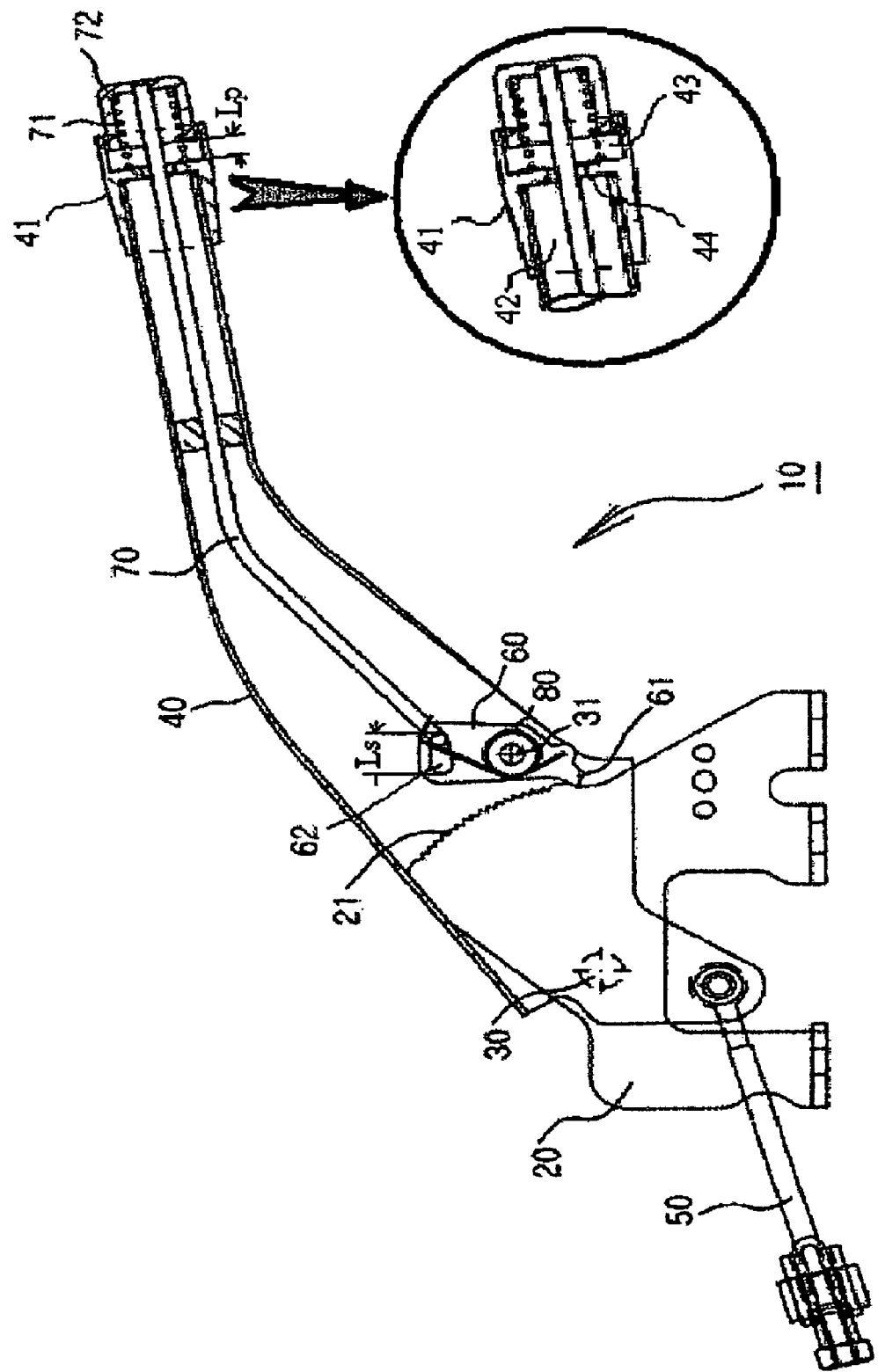
FIG. 2 is a front view of the parking brake of the present invention for illustrating the disengaged status.

Hereinafter, an anti-loosening device for a parking brake of the present invention is described in detail with reference to the accompanying drawings. FIG. 1 illustrates the exploded components of the parking brake. FIG. 2 shows a disengaged status of the parking brake.

Referring to FIGS. 1 and 2, the anti-loosening device for a parking brake 10 of the present invention consists of a ratchet wheel base 20 with multiple teeth 21 on an arc-shape edge, a pivot pin 30 for rotation, an operating lever 40 with operating mechanism 70, a linkage 50 for connecting to the braking mechanism and a latch 60 with the locking or releasing mechanism.

The ratchet wheel base 20 comprises a set of brackets for mounting on the auto-body, an arc shaped edge formed with a series of teeth 21, and a pivot hole 22 for mounting the operating lever 40.

The pivot hole 22 located at the center of the arc is provided on the ratchet wheel base 20 for installing the operating lever 40 through the pivot pin 30. A bolt hole is provided underneath the pivot hole 22 for installing a brake cable or linkage 50. At this point, enough clearance is provided between the round bottom end of the operating lever 40 and the floor of the auto-body to pull the brake cable or linkage 50 by rotation of the operating lever 40 with respect to the pivot pin 30.

A latching mechanism 60 for locking with or releasing from the arc-shaped teeth 21 consists of a pawl 61, a slot 62, a rotating shaft 31, and an elastic spring 80. The latching mechanism 60, disposed adjacent to the arc-shaped teeth 21, can be rotated with respect to the rotating shaft 31 by pushing the operating lever 40.

The operating lever 40 consists of an operating rod 70, a coil spring 71, and a push button 72. The push button 72 is mounted at one end of the operating rod 70. The coil spring 71 is mounted inside of the push button 72 for exerting an elastic force. The other end of the operating rod 70 is connected to the slot 62 of the latching mechanism 60.

The operating lever 40 has an upper portion forming a tube-shaped handle and a lower portion forming a flat and narrow cavity for installing the latching mechanism 60. The pawl 61 and the elastic spring 80 are mounted on the rotating shaft 31 which is inserted passing through both panels of the operating lever 40.

Referring to FIG. 2, a rim cap 41 has formed a lower tubal cavity 42 and an upper tubal cavity 43 being divided by an annular shaped stopper 44. Thus, the upper end of the tube-shaped handle is inserted into the lower tubal cavity 42. The push button 72 and the coil spring 71 are installed inside of the upper tubal cavity 43, so that the push button 72 is able to slide in a moving distance Lp until the bottom of the push button 72 reaches the annular shaped stopper 44, as seen in FIGS. 3 to 4.

The slot 62 has formed a sliding length Ls along with a longitudinal direction at a top portion of the latching mechanism 60. The sliding length Ls of slot 62 is same as or slightly longer than the moving distance Lp of rim cap 41, so that the bent end of the operating rod 70 can slides within the slot 62 without pushing off the pawl 61 from the arc-shaped teeth 21, as seen in FIG. 4.

Figure 3:
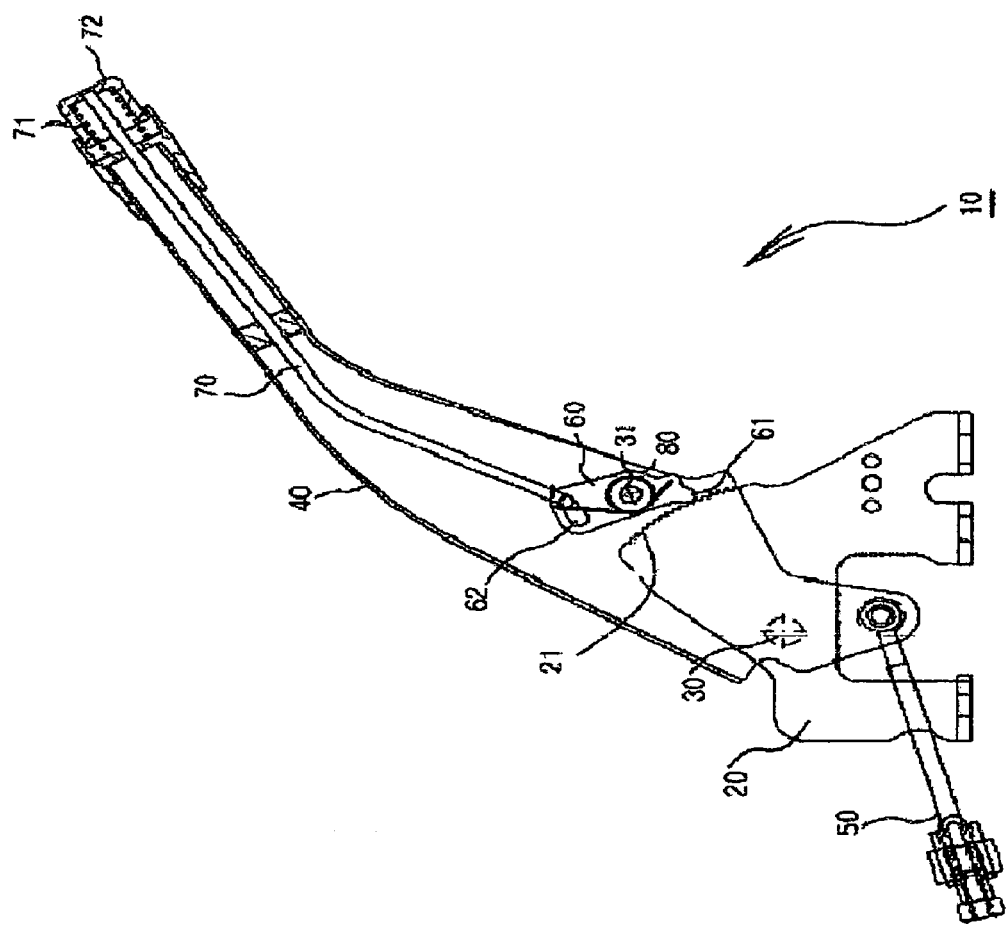
FIG. 3 is a front view of the parking brake of the present invention for illustrating the engaged status.
Figure 4:
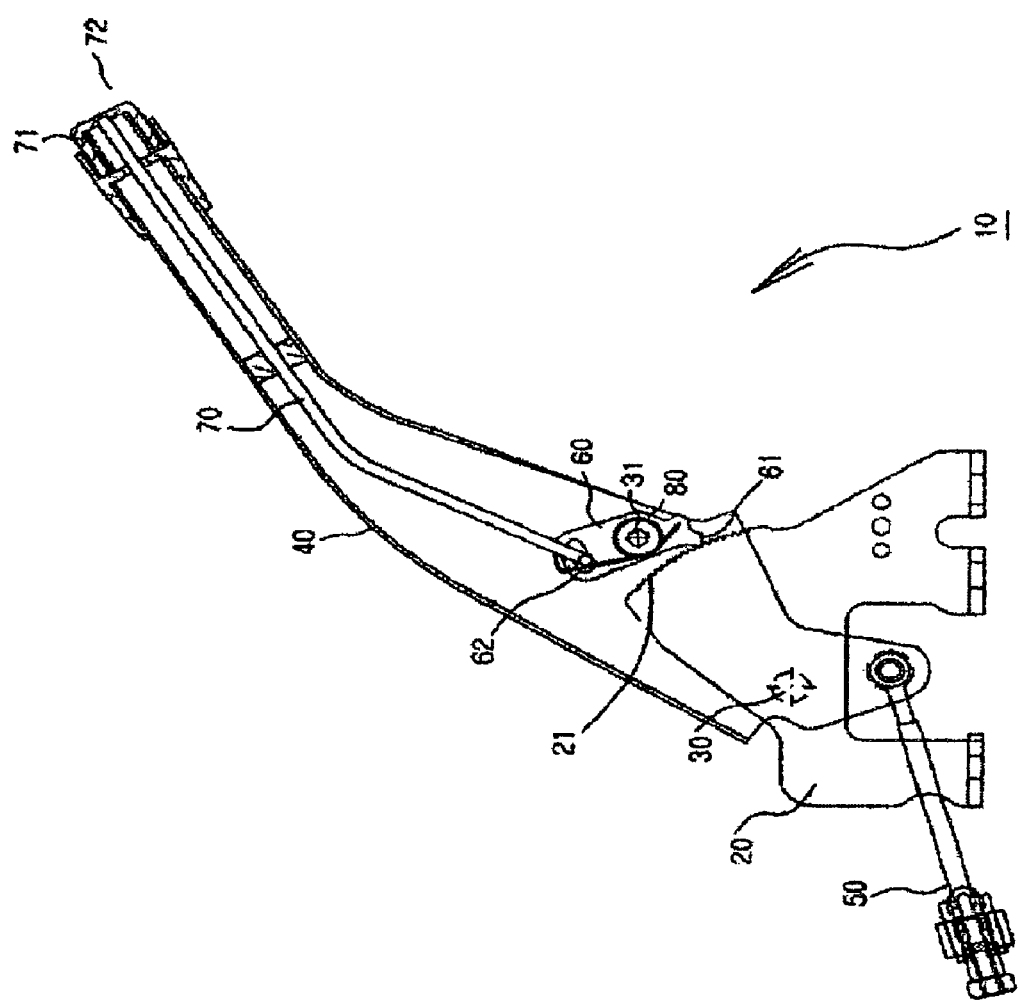
FIG. 4 is a front view of the parking brake of the present invention to show a secured operation while the parking brake is engaged.

At this point, the elastic spring 80 as shown in FIG. 3 is installed to exert a resilient force to the bent end of the operating rod 70 in the clockwise direction for maintaining the pawl 61 in a position where it is engaged with the arc-shaped teeth 21. When the push button 72 is depressed, the bent end of the operating rod 70 slides along the slot 62 counter-clockwise for pushing against the elastic spring 80 of the latching mechanism 60. While the push button 72 is held down, the bent end of the operating rod 70 will touch the end of the slot 62. At the same time, the elastic spring 80 has developed a resilient force for exerting on the pawl 61. When the operating lever 40 is slightly left-up, the pawl 61 of the latching mechanism 60 rotates counter-clockwise to disengage from the arc-shaped teeth 21.

Because the push button 72 slides in the moving distance Lp until the bottom of the push button 72 reaches the annular shaped stopper 44, and the sliding length Ls of the slot 62 is same as or slightly longer than the moving distance Lp, the bent end of the operating rod 70 is sliding within the sliding length Ls of the slot 62 without pushing the pawl 61 off from the arc-shaped teeth 21. At this point, the operating lever 40 is slightly lifted-up to allow the pawl 61 rotating counterclockwise by the elastic spring 80 for disengaging from the arc-shaped teeth 21. Then, the operating lever 40 is depressed all the way down to the disengaging position. Simultaneously, the parking brake is completely released by loosening the parking brake cable or linkage 50, as shown in FIG. 2.

When a driver wants to park the car at a parking lot or stop for a traffic signal, the driver may engage the parking brake by fully pulling up the operating lever 40 as shown in FIG. 3. At this point, the operating lever 40 rotates upwards about the pivot pin 30, while the pawl 61 of the latching mechanism 60 is disengaged for rolling upward along the arc-shaped teeth 21. As soon as the operating lever 40 reaches the maximum height position, the pawl 61 is engaged to the arc-shaped teeth 21 by the pulling tension of the parking brake cable 50. At the same time, the parking brake cable or linkage 50 connected to the bottom lower portion of the operating lever 40 is fully tensioned to engage the parking brake, so that the car wheels are forcibly locked.

Once the parking brake is engaged by the tension of the brake cable or linkage 50, the braking state won't be easily loosened due to the engagement of the pawl 61 to the arc-shaped teeth 21 and the locked state ensured by the resilient force of the elastic spring 80.

As shown in FIG. 4, the operating lever 40 has provided a failsafe device to secure the parking brake in a parked vehicle. When the push button 72 is simply pushed without lifting up the lever, for example an unwatched child curiously pushes the push button 72 in the parked car, the operating rod 70 will slide until the bent end of the rod reaches the end of the slot without disengaging the parking brake. The operating rod will be pushed back to the initial position by the resilient force of the elastic spring 80. If the operating lever 40 is lifted up and the pressing force of the push button 72 is not greater than the resilient force of the elastic spring 80, the pawl 61 of the latching mechanism 60 will be unlatched by disengaging from the arc-shaped teeth 21.

Figure 5:
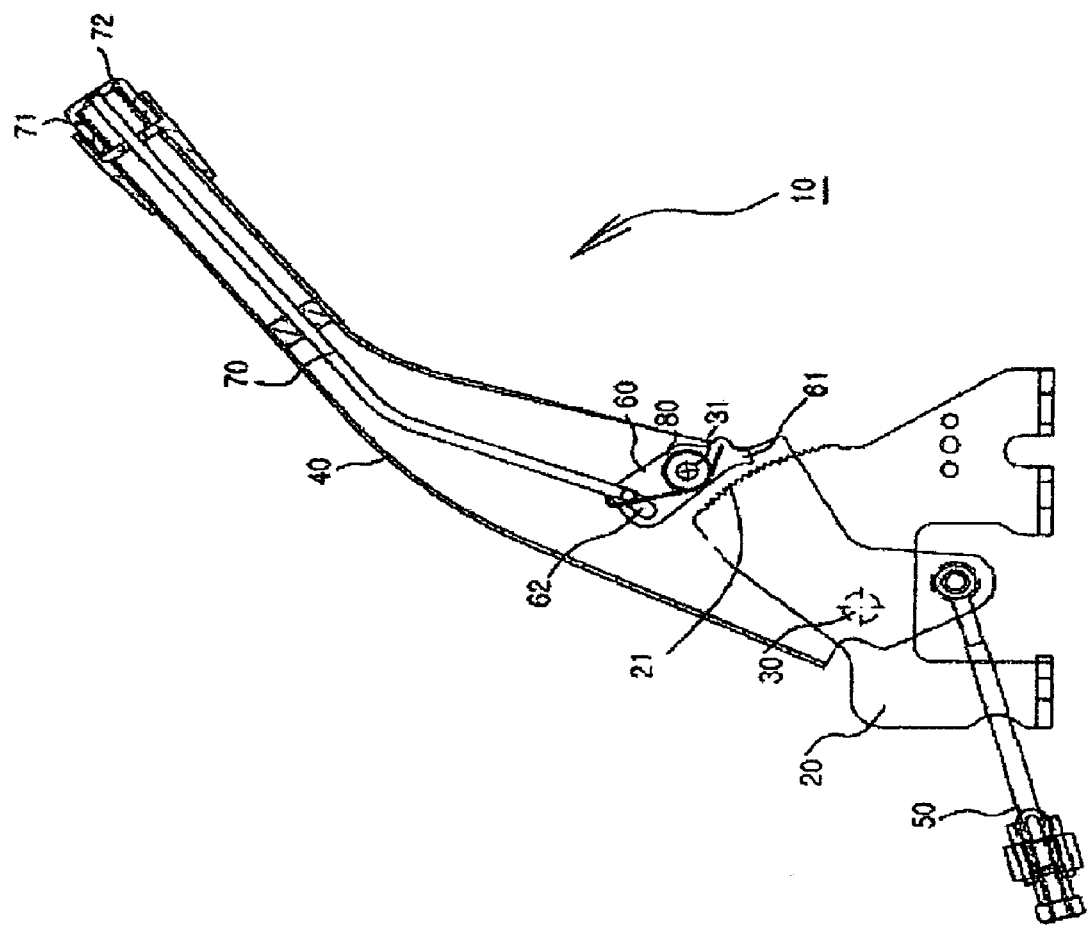
FIG. 5 is a front view of the parking brake of the present invention for releasing the parking brake.

When the vehicle is needed to operate, the driver can cancel the parking brake by slightly lifting up the operating lever 40, while simultaneously depressing the push button 72, then pushing the operating lever 40 all the way down to the disengaged position, as shown in FIG. 5 to FIG. 2. When the operating lever 40 is slightly lifted up, it will rotate with respect to the pivot pin 30 to momentarily pick-up the tension of the parking brake cable 50. At the same time, the pawl 61 of the latching mechanism 60 is rotated counterclockwise by the resilient force of the elastic spring 80 to be disengaged from the arc-shaped teeth 21. As soon as the operating lever 40 is pushed down to reach the lowest position, the pawl 61 is at the driving position. At the same time, the parking brake cable or linkage 50 connected to the bottom lower portion of the operating lever 40 is fully loosened to disengage the parking brake, so that the car wheels are free to rotate.

As discussed so far, the anti-loosening device for parking brake of the present invention has many advantages: the mechanism is simple, to remarkably reduce the production cost and provide easy maintenance, and it is equipped with a failsafe device to prevent the parking brake from being loosened accidentally while the vehicle is parked. If the push button 72 is accidentally pushed by an unwatched child, the operating rod 70 will not actuate until the bent end of the rod reaches the slot end.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An anti-loosening device (10) for a parking brake comprising:
    a ratchet wheel (20) forming multiple teeth (21) on an arc-shaped edge of a bracket, of which a base is mounted on an auto-body,
    a pivot pin (30) and a pivot hole (22) located at a center of the arc,
    an operating lever (40) having an upper portion forming a tube-shaped handle, and a lower portion forming a flat and narrow cavity for installing operating mechanisms, wherein said operating lever (40) is mounted on the ratchet wheel (20) for rotating with respect to the pivot pin (30),
    a brake cable linkage (50) connected to a lowest bottom portion of the operating lever (40) and a parking brake mechanism,
    a latching mechanism (60) consisting of a pawl (61), a slot (62), a rotating shaft (31), and an elastic spring (80), wherein said latching mechanism (60) is disposed adjacent to the arc-shaped teeth (21),
    a lever operating mechanism consisting of an operating rod (70), a coil spring (71), and a push button (72), and
    a rim cap (41) forming a lower tubal cavity (42) and a upper tubal cavity (43) divided by an annular shaped stopper (44), wherein said lower tubal cavity (42) is for inserting an end of the tube-shaped handle and said upper tubal cavity (43) is for installing the coil spring (71) and the push button (72), so that the push button (72) can slide a moving distance (Lp) until the push button (72) reaches the annular shaped stopper (74),
    one end of said operating rod (70) is mounted on the push button (72) through the annular shaped stopper (44),
    other end of said operating rod (70) is connected to the slot (62) of the latching mechanism (60), said slot (62) has a sliding length (Ls) formed along a longitudinal direction at the top portion of the latching mechanism (60), which is the same as the moving distance (Lp) of the rim cap (41), so that the operating rod (70) slides within the slot (62), said elastic spring (80) is coaxially mounted to the rotating shaft (31) of the latching mechanism (60) to exert resilient force on the operating rod (70) and the pawl (61) when the operating rod (70) is sliding along the slot (62), so that when the operating lever (40) is fully pulled-up to the maximum height position for engaging the parking brake, so that the pawl (61) is engaged to the arc-shaped teeth (21), and when cancelling the parking brake, the push button (72) is depressed and at the same time the operating lever (40) is slightly lifted up for releasing the pawl (61) from the arc-shaped teeth (21), then the operating lever is pushed all the way down to a disengage position, wherein the bent end of the operating rod (70) slides along the slot (62) to push the elastic spring (80) when the push button (72) is depressed, and simultaneously the elastic spring (80) develops a resilient force that exerts on the pawl (61) when the bent end of the operating rod (7) reaches the end of the slot (62), then the pawl (61) rotates with respect to the rotating shaft to disengage from the arc shaped teeth (21) when the operating lever (40) slightly lifts-up.

\* \* \* \* \*